(12) United States Patent
Han et al.

(10) Patent No.: US 6,359,798 B1
(45) Date of Patent: Mar. 19, 2002

(54) CHARGE PUMP VOLTAGE CONVERTER

(75) Inventors: Jun-seok Han, Seoul; Bong-nam Kim, Suwon, both of (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/850,506

(22) Filed: May 7, 2001

(30) Foreign Application Priority Data

Dec. 8, 2000 (KR) .............................. 00-74801

(51) Int. Cl.[7] .............................................. H02M 7/00
(52) U.S. Cl. ......................................... 363/60; 327/536
(58) Field of Search ..................... 363/59, 60; 327/536; 307/110

(56) References Cited

U.S. PATENT DOCUMENTS 5,748,032 A * 5/1998 Baek ........................... 363/60

* cited by examiner

Primary Examiner—Shawn Riley
(74) Attorney, Agent, or Firm—F. Chau & Associates, LLP

(57) ABSTRACT

A voltage converter is provided. A first cell having a first port, a first node to which a second clock is input, and a first capacitor connected between the first port and the first node, transmits an input signal to the first port in response to a first clock. A second cell having a second port, a second node to which an inverse second clock is input, and a second capacitor connected between the second port and the second node, transmits a signal of the first port to the second port in response to an inverse first clock. A third cell having a final port and a third capacitor coupled between the final port and ground, transmits a signal of the second port to the final port in response to the first clock. The first node and the second node are short-circuited in response to a control signal.

16 Claims, 2 Drawing Sheets

CHARGE PUMP VOLTAGE CONVERTER

BACKGROUND OF THE INVENTION

1. Technical Field

The present invention generally relates to direct current voltage converters and, more particularly, to a direct current voltage converter which is capable of increasing voltage-boosting efficiency by reducing leakage current.

2. Description of Related Art

In general, voltage converters boost an externally input signal (VCI) N times and then output the signal. In further detail, a charge pump voltage converter boosts the voltage of a unit cell having a MOS transistor and a capacitor to a desired level by cascading the unit cells. The charge pump voltage converter repeatedly pumps the charge of an input signal to the next unit cell in response to a clock signal for charge-pumping so as to boost the voltage. If the voltage converter is realized by a capacitor within an integrated circuit (IC), parasitic capacitance is generated in the voltage converter. Consequently, a leakage current is generated, thus decreasing the voltage-boosting efficiency.

FIG. 1 is a circuit diagram illustrating a conventional charge pump voltage converter 10. The charge pump voltage converter 10 includes capacitors C0, C1, C2, and Cs used for charge-pumping, charge-pumping control signals $\phi$, $\bar{\phi}$, $\theta$ and $\bar{\theta}$ and PMOS transistors P1, P3, P5 and P7 which respond to the charge-pumping control signals $\theta$ and $\bar{\theta}$.

The charge pumping control signals $\phi$ and $\bar{\theta}$ are signals having a different voltage level from each other or having the same phase. On the other hand, the other pumping control signals $\bar{\phi}$ and $\bar{\theta}$ are in-phase signals having a different voltage level from each other. Here, $\phi$ and $\bar{\phi}$ are out of phase and have a predetermined non-overlapped interval (Notm).

If the capacitors C0, C1, and C2 used for charge-pumping are built into an integrated circuit, parasitic capacitances Cp0, Cp1, and Cp2 exist between a plate of the capacitors C0, C1, and C2 and a substrate. The control signal $\phi$ or $\bar{\phi}$ used for charge-pumping enters one side of the plate of the parasitic capacitances Cp0, Cp1, and Cp2, and a fixed voltage such as, ground (VSS) is input into the other side of the plate. Consequently, each of the parasitic capacitances Cp0, Cp1, and Cp2 serves as a storage capacitor.

FIG. 2 is a diagram illustrating the output waveforms of nodes M0, M1, and M2 constituting the conventional charge pump voltage converter 10 of FIG. 1. With reference to FIGS. 1 and 2, a phenomenon in which a leakage current flows will be described.

The control signals (clocks signals $\phi$ and $\bar{\phi}$), which have a predetermined level and swing between an input signal (VCI) and ground (VSS), are input into one plate of the parasitic capacitances Cp0, Cp1, and Cp2. If $\phi$ is VCI and $\bar{\phi}$ is VSS, then Cp0 and Cp2 are charged to the level of the input signal (VCI). If $\phi$ is changed into VSS and $\bar{\phi}$ is changed into VCI, then Cp1 is charged to the level of the input signal (VCI) and simultaneously the electric charges of Cp0 and Cp2 (which have already been charged) change to the level of the earth voltage (VSS), thereby generating a leakage current.

Also, if $\phi$ is changed into VCI and $\bar{\phi}$ is changed into VSS in the next clock phase, Cp0 and Cp2 are charged to the level of the input signal (VCI) and simultaneously the electric charge of Cp1 changes to the level of ground (VSS), thus generating a leakage current again.

In other words, the parasitic capacitances Cp0, Cp1, and Cp2 generate a leakage current by repeating charge and discharge operations in response to clocks signals $\phi$ and $\bar{\phi}$. Therefore, the voltage level of each of the nodes M0, M1, and M2 decreases and consequently the level of the boosted voltage decreases.

SUMMARY OF THE INVENTION

To solve the above and other problems of the prior art, there is provided a voltage converter which can enhance the voltage-boosting efficiency by decreasing the leakage current.

According to an aspect of the invention, there is provided a voltage converter that includes a first cell, having a first output port, a first node to which a second clock signal is input, and a first capacitor connected between the first output port and the first node. The first cell transmits an input signal to the first output port in response to a first clock signal. A second cell has a second output port, a second node to which an inverse signal of the second clock signal is input, and a second capacitor connected between the second output port and the second node. The second cell transmits a signal of the first output port to the second output port in response to the inverse signal of the first clock signal. A third cell has a final output port and a third capacitor coupled between the final output port and a ground. The third cell transmits a signal of the second output port to the final output port in response to the first clock signal. The first node and the second node are short-circuited in response to a control signal.

According to another aspect of the invention, the first clock signal and the second clock signal are in phase. Moreover, the inverse signal of the first clock signal and the inverse signal of the second clock signal are in phase.

According to yet another aspect of the invention, the first clock signal and the inverse signal of the first clock signal have a non-overlapped interval.

According to still yet another aspect of the invention, the control signal results from performing an exclusive-OR operation on the second clock signal and a signal generated by delaying the second clock signal for a predetermined time and is activated in the non-overlapped interval.

According to a further aspect of the invention, a parasitic capacitance is formed between the first capacitor and the first node or between the second capacitor and the second node.

According to still a further aspect of the invention, the voltage converter is embodied as an integrated circuit.

These and other aspects, features and advantages of the present invention will become apparent from the following detailed description of preferred embodiments, which is to be read in connection with the accompanying drawings.

DETAILED DESCRIPTION OF PREFERRED EMBODIMENTS

Figure 1:
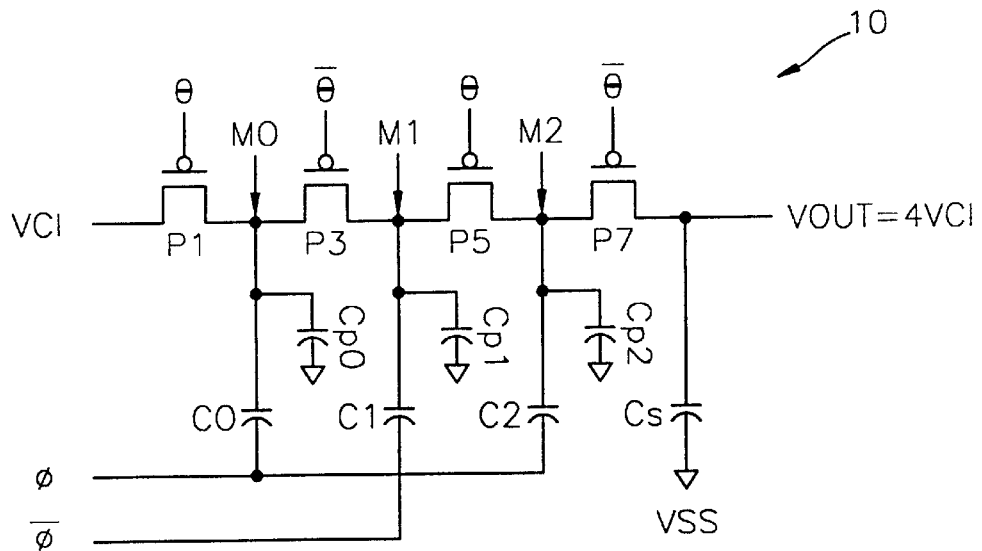
FIG. 1 is a circuit diagram illustrating a conventional charge pump voltage converter.

Hereinafter, the present invention will be described in detail by explaining a preferred embodiment of the present invention with reference to the attached drawings. The same reference numerals in different drawings represent the same or similar elements.

Figure 3:
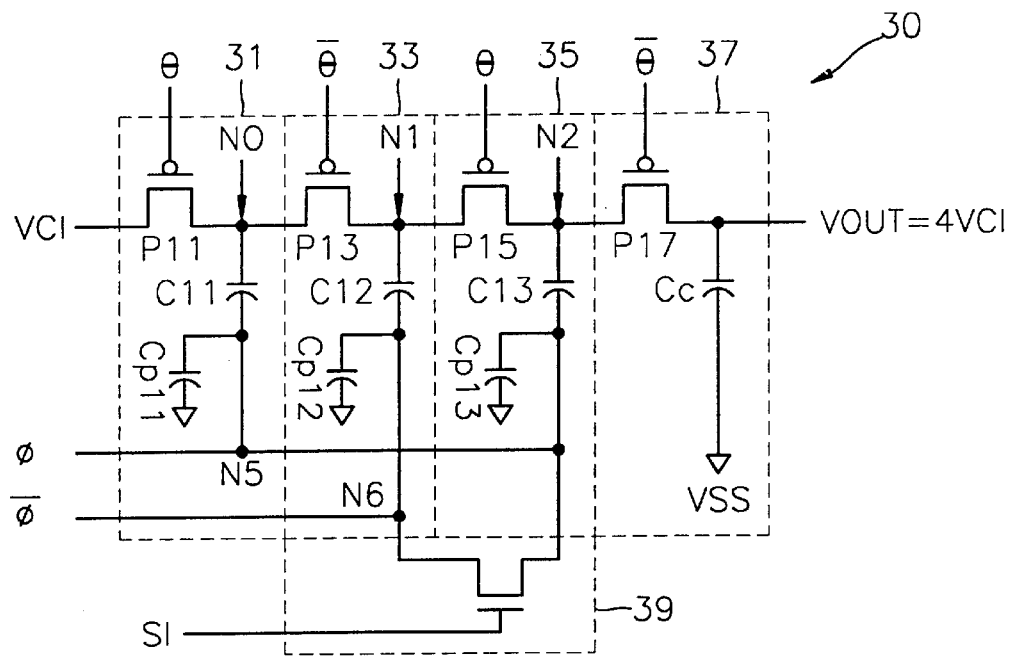
FIG. 3 is a circuit diagram illustrating a charge pump voltage converter according to an illustrative embodiment of the present invention.

FIG. 3 is a circuit diagram illustrating a charge pump voltage converter according to an illustrative embodiment of the present invention. The charge pump voltage converter 30 is a circuit for boosting the voltage of an input signal (VCI) four times (VOUT=4VCI). The charge pump voltage converter 30 includes a first cell 31, a second cell 33, a third cell 35, a fourth cell 37 and a switch 39.

The first cell 31, the second cell 33, the third cell 35, and the fourth cell 37 respectively include PMOS transistors P11, P13, P15, and P17, and capacitors C11, C12, C13, and Cc. Parasitic capacitors Cp11, Cp12, and Cp13 are formed between a lower plate of the capacitors C11, C12 and C13 and a substrate.

The first cell 31 transmits an input signal (VCI) to a first output port No in response to a first clock signal θ which is input into the gate of the PMOS transistor P11.

The first cell 31 includes the first capacitor C11 connected between the first output port N0 and a first node N5 where a second clock signal φ is input. Accordingly, the input signal (VCI) can be charged in the first capacitor C11 in response to the first clock signal θ. Also, the first parasitic capacitance Cp11 is formed between the lower plate of the first capacitor C11 and the first node NS.

The second cell 33 transmits a signal of the first output port N0 to a second output port N1 in response to an inverse clock signal $\overline{\theta}$ with respect to the first clock signal θ. The second cell 33 includes the second capacitor C12 being connected between the second output port N1 and a second node N6 to which the inverse clock signal $\overline{\phi}$ with respect to the second clock signal is input. Accordingly, the signal of the first output port N0 can be charged into the second capacitor C12 in response to the inverse clock signal $\overline{\theta}$ of the first clock signal. Also, the second parasitic capacitance Cp12 is formed between the lower plate of the second capacitor C12 and the second node N6.

The third cell 35 transmits a signal of the second output port N1 to a third output port N2 in response to the first clock signal θ which is input into the gate of the PMOS transistor P15. The third cell 35 includes the third capacitor C13 which is connected between a third output port N2 and the first node N5 where the second clock signal φ is input. Accordingly, the signal of the second output port N1 can be charged into the third capacitor C13 in response to the first clock signal 0. Also, the third parasitic capacitance Cp13 is formed between the lower plate of the third capacitor C13 and the first node N5.

The fourth cell 37 transmits a signal of the third output port N2 to a final output port VOUT in response to the inverse clock signal $\overline{\theta}$ of the first clock signal, which is input into the gate of the PMOS transistor P17. The upper plate of the fourth capacitor Cc is connected to the final output port VOUT and the lower plate of the fourth capacitor Cc is connected to ground Vss. The fourth capacitor Cc can be built in an IC, similar to the first capacitor C11, or it can be external to the IC and connected thereto.

The switch 39 is an NMOS transistor and shorts the first node N5 and the second node N6 in response to a control signal SI. The control signal SI is an output signal resulting from an exclusive-OR gate (not shown) in which the second clock signal φ is one input signal and an output signal from a delay element (not shown) which delays the second clock signal φ for a predetermined time is the other input signal.

FIG. 3 illustrates a circuit which can boost the voltage of the input signal VCI four times. In the circuit of FIG. 3, the first cell 31, the second cell 33, the third cell 35 and the fourth cell (or the final cell) 37 are cascaded.

However, a voltage converter to boost the voltage of the input signal VCI N times (N is a natural number and indicates the sum of the first cells and the second cells) can also be embodied by alternately connecting the first cell 31 and the second cell 33 in series until the total number of the cells connected in series amounts to N-1 and subsequently connecting in series the final cell which is the N-th cell and has the same structure as the above fourth cell 37, to the N-1-th cell.

For example, a voltage converter which can boost the voltage of the input signal VCI three times includes the first cell, the second cell and the final cell 37 which are connected in series. The structures of the first cell 31, the second cell 33 and the final cell 37 are the same as those illustrated in FIG. 3.

The PMOS transistors P11, P13, P15, and P17 of each of the cells and the switch 39 can serve as switches which respond to the first clock signal a and the control signal SI. Therefore, their variations are apparent to those skilled in the art.

Figure 2:
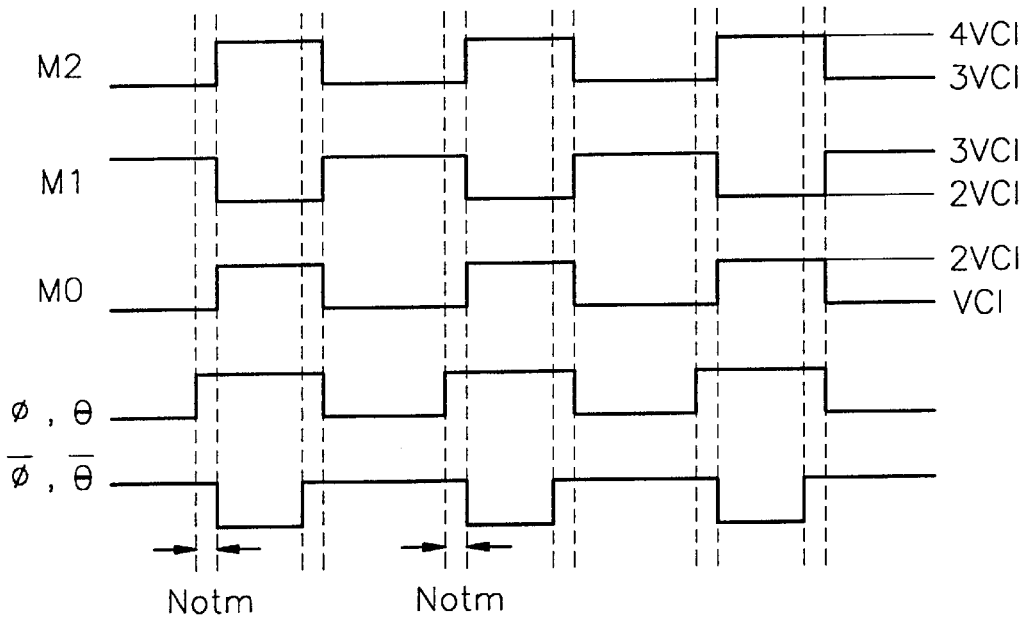
FIG. 2 is a diagram illustrating the output waveforms of nodes constituting a conventional charge pump voltage converter.

According to conventional technology as shown in FIGS. 1 and 2, the parasitic capacitance Cp0, Cp1 and Cp2 are respectively formed between the first output port M0 and the first capacitor C0, between the second output port M1 and the second capacitor C1, and between the third output port M2 and the third capacitor C2. However, the parasitic capacitances Cp11, Cp12, and Cp13 of the charge pump voltage converter 30 according to the present invention, are formed between the first capacitor C11 and the first node N5, between the second capacitor C12 and the second node N6, and between the third capacitor C13 and the first node N5, by adjusting their positions in the layout.

In other words, the parasitic capacitances Cp11, Cp12, and Cp13 can be embodied by a method in which a first insulator is deposited on a substrate (not shown) and the capacitors C11, C12, and C13 are formed on the first insulator.

Figure 4:
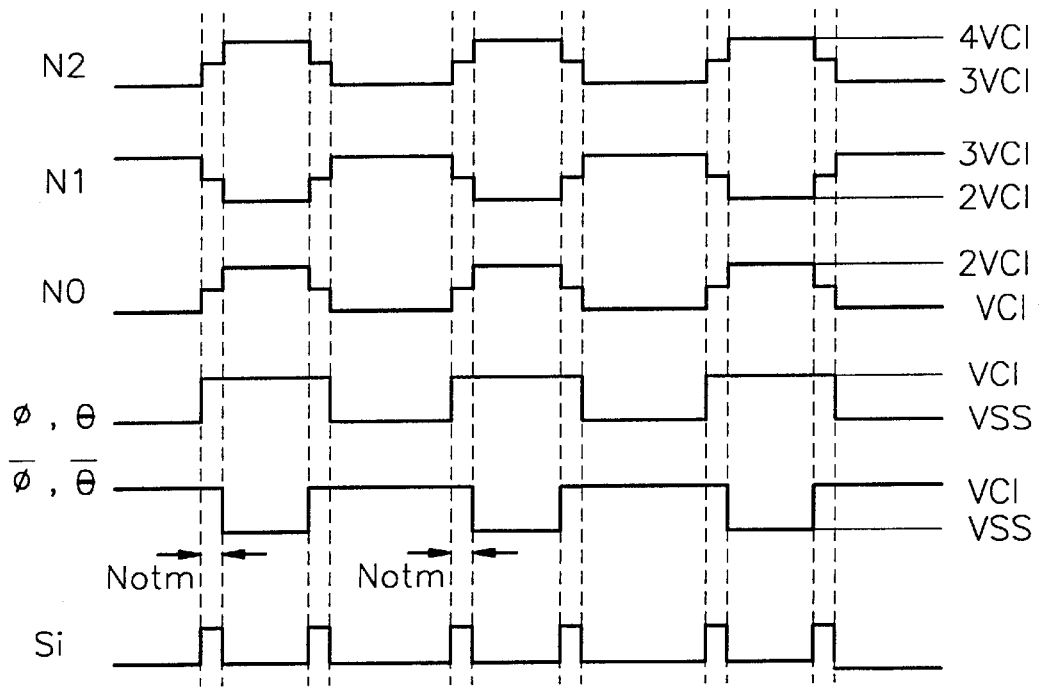
FIG. 4 is a diagram illustrating the output waveforms of nodes constituting a conventional charge pump voltage converter according to an illustrative embodiment of the present invention.

FIG. 4 is a diagram illustrating waveforms of the clock signals φ and θ which are used for the operations of the unit cells 31, 33, and 35 forming the charge pump voltage converter 30, and the outputs N0, N1, and N2 of the unit cells. Here, the first clock signal θ and the second clock signal φ can be at different voltage levels, but are in phase. Also, the inverse clock signal $\overline{\theta}$ to the first clock and the inverse clock signal $\overline{\phi}$ can be at different voltages, but are in phase.

In the case of FIG. 4, the first clock signal θ and the second clock signal φ are signals having the same voltage level and phase and the inverse signal $\overline{\theta}$ of the first clock signal and the inverse signal $\overline{\phi}$ of the second clock signal are signals having the same voltage and phase.

The first clock signal and the second clock signal are signals swinging between ground (VSS) and an input signal (VCI) level. Also, the inverse signal of the first clock signal and the inverse signal of the second clock signal are signals swinging between ground (VSS) and the input signal (VCI) level.

N0 is the output port voltage of the first cell 31 which swings from the level of the input signal (VCI) to the doubled voltage (2VCI) of the input signal (VCI). N1 is the output port voltage of the second cell 33 which swings from the doubled voltage (2VCI) of the input signal (VCI) to the tripled voltage (3VCI) of the input signal (VCI). Also, N2 is the output port voltage of the third cell 35 which swings from the tripled voltage (3VCI) of the input signal (VCI) to the quadrupled voltage (4VCI) of the input signal (VCI).

Preferably, non-overlapping intervals (Notm) are provided to prevent the first clock signal θ and the inverse signal $\bar{\theta}$ to the first clock signal from being input simultaneously, that is, to prevent overlapping of the signals θ and $\bar{\theta}$.

If the control signal (SI) becomes active (that is, logic 'high') within the non-overlapped interval (Notm), the switch 39 shorts the first node N5 and the second node N6 in response to the control signal (SI). Consequently, the parasitic capacitors Cp11, Cp12, and Cp13 which are connected to the first node or the second node share the electric charge, thereby reducing the amount of leakage current.

In general, electric charge (Q) divided by time (t) gives electric current (I), and voltage (V) multiplied by capacitance (C) gives electric charge (Q). Accordingly, if the electric charge is reduced through the adjustment of the voltage (V) affecting the parasitic capacitances Cp11, Cp12, and Cp13, leakage current (I) can be decreased.

However, operations for decreasing leakage current must not have any influence on voltage-boosting through each of the cells 31, 33, and 35. Therefore, it is preferable that the decrease in leakage current is carried out within the non-overlapped interval (Notm).

Within the non-overlapped interval (Notm), the voltage levels of the second clock signal ( and its inverse signal $\bar{\phi}$ are at a floating state (VCI). Accordingly, all the voltage levels of the nodes N0, N1, and N2, the first node N5 and the second node N6 are at a floating state (that is, VCI state). Therefore, the electric charge and electric potential of the capacitors C11, C12, and C13 and the parasitic capacitors Cp11, Cp12, and Cp13 can be maintained.

If the control signal (SI) is activated (becomes logic 'high') in the non-overlapped interval (Notm), the first node N5 and the second node N6 are short-circuited. Consequently, due to a difference in voltage levels between the time periods prior and subsequent to the activation of the control signal (SI), the electric charge of the parasitic capacitors Cp11, Cp12, and Cp13 moves.

When the first node N5 and the second node N6 are short-circuited, the variation in the voltage level of the parasitic capacitors Cp11, Cp12, and Cp13 is far less than that of the parasitic capacitors formed by a conventional technology.

Referring to FIG. 4, a case in which normal charge-pumping is performed passing through the non-overlapped interval (Notm) will be described. In this case, although the second clock signal φ and its inverse signal $\bar{\phi}$ swing between ground (VSS) and the input signal (VCI) level, the voltage level of the parasitic capacitors Cp11, Cp12, and Cp13 are considerably decreased so as to be less than the swing width of the second clock signal and its inverse signal.

Therefore, the voltage affecting the parasitic capacitors Cp11, Cp12 and Cp13 is decreased and the quantity of moving electric charge is also decreased, thereby reducing leakage current caused by the parasitic capacitors. Accordingly, the voltage-boosting efficiency can be enhanced.

As described above, the charge pump voltage converter according to the present invention can reduce leakage current, thus increasing the voltage-boosting efficiency.

Although the illustrative embodiments have been described herein with reference to the accompanying drawings, it is to be understood that the present system and method is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A voltage converter comprising:
    a first cell, having a first output port, a first node to which a second clock signal is input, and a first capacitor connected between the first output port and the first node, the first cell for transmitting an input signal to the first output port in response to a first clock signal;
    a second cell, having a second output port, a second node to which an inverse signal of the second clock signal is input, and a second capacitor connected between the second output port and the second node, the second cell for transmitting a signal of the first output port to the second output port in response to an inverse signal of the first clock signal; and
    a third cell, having a final output port and a third capacitor coupled between the final output port and a ground, the third cell for transmitting a signal of the second output port to the final output port in response to the first clock signal,
    wherein the first node and the second node are short-circuited in response to a control signal.

2. The voltage converter of claim 1, wherein the first clock signal and the second clock signal are in phase.

3. The voltage converter of claim 1, wherein the inverse signal of the first clock signal and the inverse signal of the second clock signal are in phase.

4. The voltage converter of claim 1, wherein the first clock signal and the inverse signal of the first clock signal have a non-overlapped interval.

5. The voltage converter of claim 1, wherein the control signal results from performing an exclusive-OR operation on the second clock signal and a signal generated by delaying the second clock signal for a predetermined time.

6. The voltage converter of claim 4, wherein the control signal is activated in the non-overlapped interval.

7. The voltage converter of claim 1, wherein a parasitic capacitance is formed between the first capacitor and the first node or between the second capacitor and the second node.

8. The voltage converter of claim 1, wherein the voltage converter is embodied as an integrated circuit.

9. A voltage converter comprising:
    a plurality of odd and even cells connected in series and terminated with an N-1 cell, each of the plurality of odd cells having a first output port, a first node to which a second clock signal is input, and a first capacitor connected between the first output port and the first node, each of the plurality of odd cells for transmitting an input signal to the first output port in response to a first clock signal, each of the plurality of even cells having a second output port, a second node to which an inverse signal of the second clock signal is input, and a second capacitor connected between the second output port and the second node, each of the plurality of even cells for transmitting a signal of the first output port to the second output port in response to the inverse signal of the first clock signal; and
    a N cell connected in series to the N-1 cell, having a final output port and a third capacitor coupled between the final output port and a ground, the N cell for transmitting an output signal of an output port of the N-1 cell to the final output port in response to the first clock signal or the inverse signal of the first clock signal, wherein the first node and the second node are short-circuited.

10. The voltage converter of claim 9, wherein the first clock signal and the second clock signal are in phase.

11. The voltage converter of claim 9, wherein the inverse signal of the first clock signal and the inverse signal of the second clock signal are in phase.

12. The voltage converter of claim 9, wherein the first clock signal and the inverse signal of the first clock signal have a non-overlapped interval.

13. The voltage converter of claim 9, wherein the control signal results from performing an exclusive-OR operation on the second clock signal and a signal generated by delaying the second clock signal for a predetermined time.

14. The voltage converter of claim 12, wherein the control signal is activated in the non-overlapped interval.

15. The voltage converter of claim 9, wherein a parasitic capacitance is formed between the first capacitor and the first node or between the second capacitor and the second node.

16. The voltage converter of claim 9, wherein the voltage converter is embodied as an integrated circuit.

* * * * *